March 31, 1964 R. R. MATTHEWS ETAL 3,126,919
ONE-SHOT MODIFIED AXMINSTER WEAVE AND METHOD OF MAKING SAME
Filed Oct. 17, 1960 8 Sheets-Sheet 1

INVENTORS
JOHN L. HUBBARD
RUSSELL R. MATTHEWS

BY

*heech and Radue*
ATTORNEYS

INVENTORS
JOHN L. HUBBARD
RUSSELL R. MATTHEWS

BY Heech and Radue

ATTORNEYS

INVENTORS
JOHN L. HUBBARD
RUSSELL R. MATTHEWS
BY Leech and Radue
ATTORNEYS

March 31, 1964  R. R. MATTHEWS ETAL  3,126,919
ONE-SHOT MODIFIED AXMINSTER WEAVE AND METHOD OF MAKING SAME
Filed Oct. 17, 1960  8 Sheets-Sheet 4

INVENTORS
JOHN L. HUBBARD
RUSSELL R. MATTHEWS
BY Fred L. Witherspoon, Jr. and
Fred. E. Shoemaker
ATTORNEY

INVENTORS
JOHN L. HUBBARD
RUSSELL R. MATTHEWS

March 31, 1964 R. R. MATTHEWS ETAL 3,126,919
ONE-SHOT MODIFIED AXMINSTER WEAVE AND METHOD OF MAKING SAME
Filed Oct. 17, 1960 8 Sheets-Sheet 7

INVENTORS
JOHN L. HUBBARD
RUSSELL R. MATTHEWS
BY
ATTORNEYS

March 31, 1964 R. R. MATTHEWS ETAL 3,126,919
ONE-SHOT MODIFIED AXMINSTER WEAVE AND METHOD OF MAKING SAME
Filed Oct. 17, 1960 8 Sheets—Sheet 8

INVENTORS
JOHN L. HUBBARD
RUSSELL R. MATTHEWS
BY
ATTORNEYS

United States Patent Office 3,126,919
Patented Mar. 31, 1964

3,126,919
ONE-SHOT MODIFIED AXMINSTER WEAVE AND METHOD OF MAKING SAME
Russell R. Matthews, Cornwall, and John L. Hubbard, Cornwall on the Hudson, N.Y., assignors, by mesne assignments, to Mohasco Industries, Inc., Amsterdam, N.Y., a corporation of New York
Filed Oct. 17, 1960, Ser. No. 63,222
6 Claims. (Cl. 139—7)

The present invention relates to Axminster carpets that are woven with only one double back shot to each face row; and it further relates to a novel method for producing this weave.

The principal object of this invention is to provide a modified form of Axminster weave by means of which the inherent slowness of the weaving operation has been overcome by the elimination of two of the double weft shots in the back over which no face wool lies. It is well known in the art that the regular Axminster carpet, which is also known as the Imperial Axminster, requires that the needle or shuttle, as the case may be, insert three double weft shots in the back of the carpet and that after the first two double weft shots have been so inserted U-tufts of pile yarn are inserted on the third double weft shot. The principal and the greatest advantage of an Axminster loom, as well as of the woven product which is made thereon, is the fact that the pattern and the amount of colors used are unlimited for the designer. Without limitation, any pattern and any design is possible on the Axminster loom. While this is a primary advantage of the Axminster loom, the process of manufacturing today on the Axminster loom also is subject to rigorous competition in the matter of speed of manufacturing on other type looms.

Those versed in this art will realize that the insertion of the two double weft shots in the back prior to the insertion of the face row on the third double weft shot constitutes a time consuming waste of motion. Nevertheless, it has been found necessary to employ this three-cycle type of weave for the mere reason that the spool frames employed in the Axminster loom for supplying the face yarn require as much time to be inserted and to be released as is involved in inserting the two double weft shots around which no face yarn is formed.

Therefore, it is the primary object of this invention to provide a modified Axminster weave and method of making same in which it is possible to insert a face row around each and every double weft shot inserted in operation of the loom.

It is a further object of this invention to provide an Axminster fabric which, for all practical purposes, has all the design and color possibilities of the regular Axminster without the hindrance of the two untufted double weft shots in the conventional fabric as now produced.

Another object of this invention is to devise a new method of making Axminster carpet wherein the production rate is three times as fast as that on the conventional Axminster loom, and, therefore, becomes an economic competitor of the speedier machines used in modern manufacturing.

Since the end of World War II the carpet industry has had competition of different sorts of machinery such as the sewing type tufting machinery, knitting machinery, and other high speed equipment. Even double plush looms have been invented for the purpose of making Broadloom carpet in order greatly to increase production speed and output. Thus there was developed a two-shot modified Axminster weave as shown in United States Patent No. 2,718,243 to R. R. Matthews. By eliminating the double weft shot around which there is no face yarn the two-shot weave of the Matthews patent made it possible to double the production of an Axminster loom. This invention has proved very helpful and encouraging in meeting the competition of higher speed machinery producing fabrics of a different kind that are sold in the same markets as Axminster carpet.

When each U-tuft goes through the back and the U-tufts of each row lie immediately adjacent those of the next row, no row marks between rows will be noticeable in the finished fabric.

Furthermore, it will be understood that by virtue of the fact that two double weft shots are eliminated per face row a saving of weft yarn is made possible, and such saving can be used for either making a more reasonably priced product or using a finer sizing material, than is generally used in the back. The common and prevalent practice of producing pile fabric floor coverings by punching threads through a previously woven backing involves a great waste of face yarn to produce a hook or punched effect, which through this invention is obtainable with much less yarn than on a standard Axminster loom in which the back is woven and a face yarn inserted simultaneously.

The foregoing and other objectives and advantages of this invention will be more clearly understood from the following detailed description of illustrative embodiments thereof when taken in conjunction with the accompanying drawings, in which.

Figure 2:
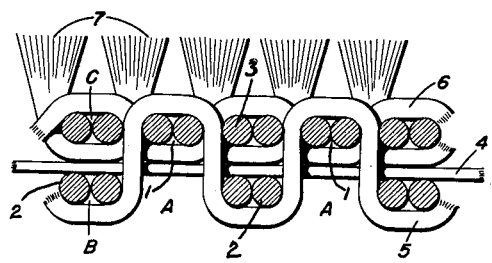
FIGURE 2 is a warpwise section of a regular Imperial Axminster weave.

As mentioned in the preliminary explanation, FIGURE 2 shows the diagrammatic section of a regular Axminster weave wherein there is a cycle of three in which space A is for the first double weft shot 1, space B is for the second double weft shot 2 of the cycle and, space C is for the third weft shot 3. It will be noticed that in FIGURE 2 there is a stuffer warp 4, a binder warp 5, and a chain warp 6. The stuffer warp 4 lies under double weft shot 2, whereas the binder warp 5 lies under double weft shots 2 and 3 and over double weft shot 1, and the chain 6 lies over double weft shots 2 and 3 and under double weft shot 1. The tuft 7 is bound in by double weft shot 3 as shown in FIGURE 2, and usually lies above double weft shot 2, and is squeezed upright by double weft shot 1.

Figure 3:
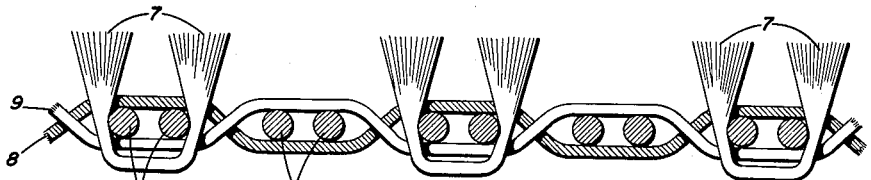
FIGURE 3 is a warpwise section of a two-shot Axminster fabric made in accordance with Matthews Patent No. 2,718,243.

In FIGURE 3 the tuft 7 is placed as described in Matthews Patent No. 2,718,243. In this instance double weft shots 4 and 5 are repeated in consecutive order. There are also two binder warps, binder warp 8 going over double weft shot 4 and under double weft shot 5, and binder warp 9 going under double weft shot 4 and over double weft shot 5. The tuft 7 is formed around double weft shot 4 and it may be seen that in this version only two binders are necessary instead of the usual three in an ordinary Axminster as shown in FIGURE 2.

Figure 1:
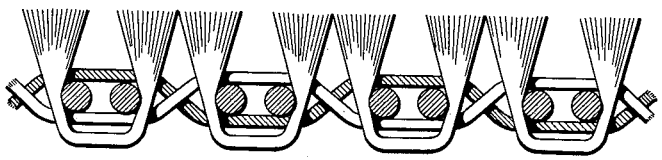
FIGURE 1 is a warpwise section of a one-shot Axminster fabric that is of prior art construction.
Figure 4:
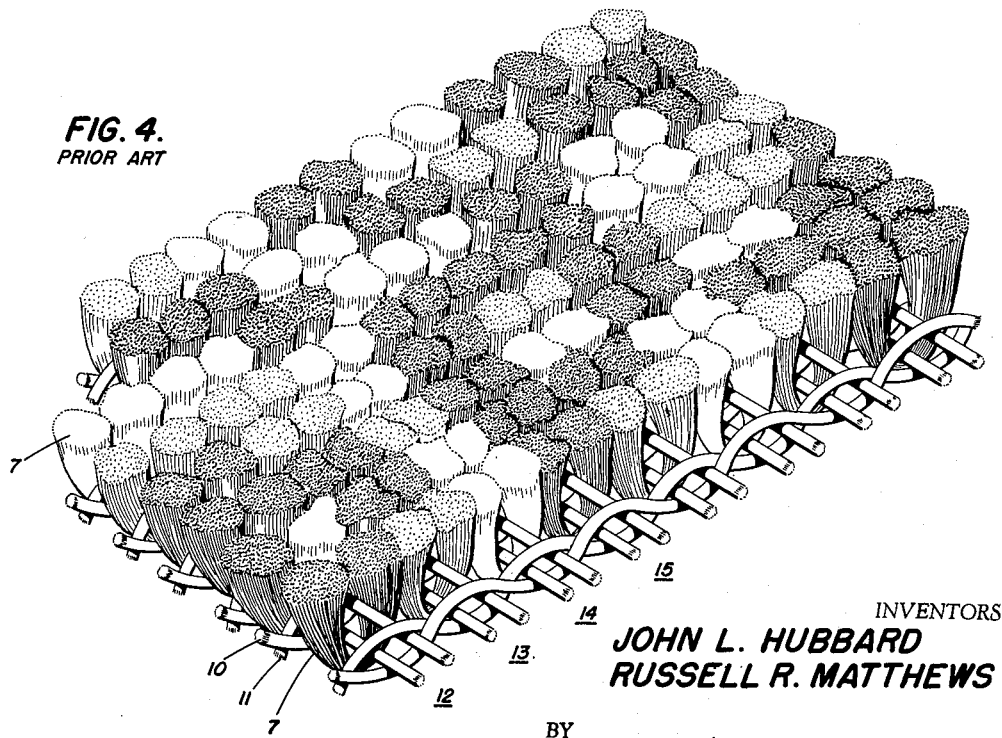
FIGURE 4 is an isometric view showing how a group of U-tufts of the pattern are inserted in the base weave of one-shot Axminster construction.

Now coming to FIGURE 4 of the drawing, the U-tufts are 7, and the binder warps are shown as chains 10 and 11 going over double weft shot 12, under double weft shot 13, over double weft shot 14, and under double weft shot 15, and show chain 11 going under double weft shots 12 and 14 and over double weft shots 13 and 15 respectively. As may be seen further, the U-tufts 7 are formed around each double weft shot and, providing the speed of the machine that manufactures the weave of FIGURE 2 has not been decreased, but has been adjusted to the fabric of FIGURE 1, three times the production may be achieved. Also one saves at least ⅔ of the warp binder material for which cotton of the numeration of 8/3 ply or 9/3 ply is used by preference, and one saves also at least ⅔ of the material for the double weft shots for which jute of the numeration for anywhere between 10 and 14 pounds is preferably used. Material like jute for the double weft shots is doubly necessary in a one-shot Axminster weave because jute does not tend to shrink as much as cotton or other materials. Since an Axminster loom requires proper distances for the insertion of the face yarn of the spool frames into the backing material and an exact pitch, therefore, appreciable shrinkage would make it difficult or practically impossible to insert the two frames properly, especially in the new weave construction where the spool frame has to insert itself around each backing weft. For these reasons jute, linen, or the like is preferred for such backing material.

FIGURE 4 shows chains 10 and 11 respectively on the outer side and double weft shots 12, 13, 14, 15, etc. Also on the right side of the drawing the different shadings indicate various face yarn colors appearing in the fabric. As is well known to those familiar with this art the multitude of colors indicated in FIGURE 4 in the tufts comprises the especial advantage of the Axminster loom, which has been retained in this invention. It is a novel operation and adaptation of the Axminster loom that constitute the present invention, as will be brought out in connection with FIGURE 5 having rows of cut pile tufts 7 in warp line 16 and the same in warp line 17. Chain warps 10 and 11 are shown between rows of U-shaped tufts 7 in considerably enlarged view, and double weft shots 12, 13, 14, 15, etc., are shown likewise. It will be understood from this particular drawing that the lack of extra double weft shots would mean that double weft shots 12 and 13 will leave a slightly open space in the back of the carpet. This can be overcome by sizing the back of the carpet with materials such as starch, rubber or rubber blends, or vinyl resin, or other plastics or plasticols, as may seem advantageous as a backing of a soft surface floor covering.

Figures 5, 6:
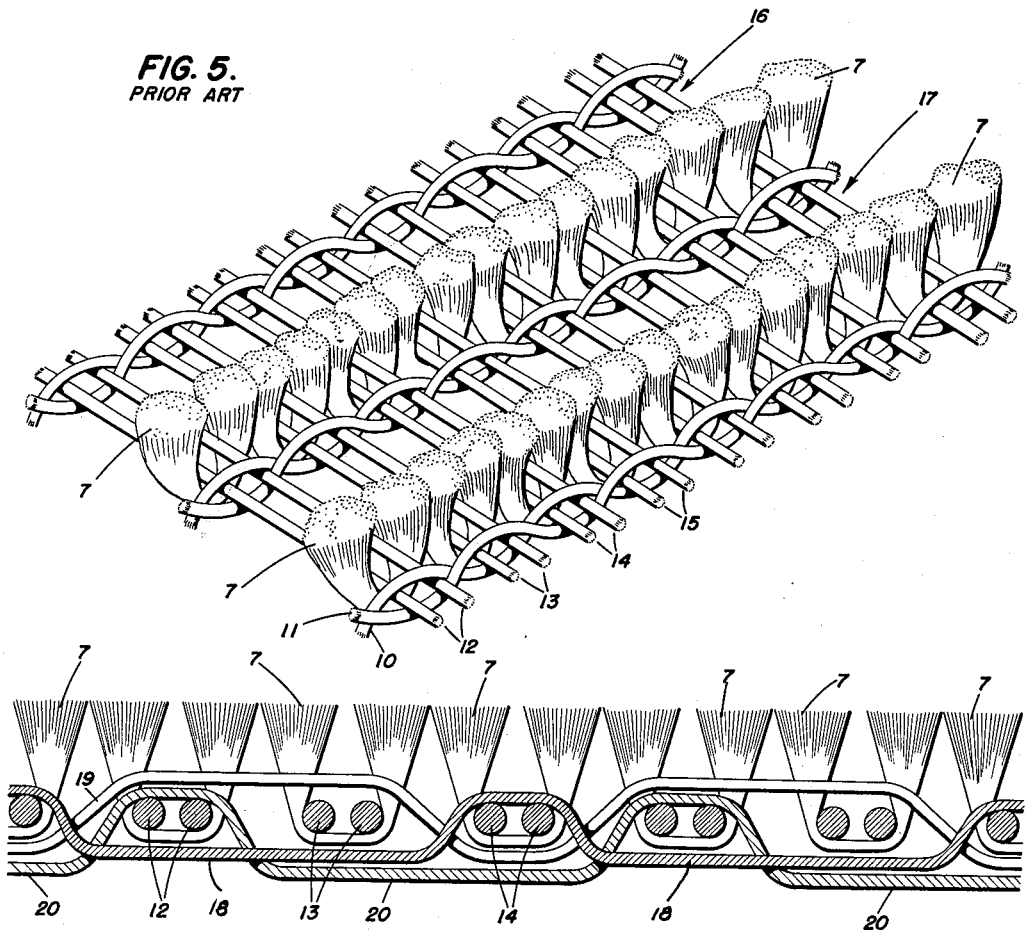
FIGURE 5 is an enlarged and expanded isometric view of two warpwise rows of U-tufts indicating how they are inserted around the wefts between the chain warps.
FIGURE 6 is a warpwise section of a novel weave of this invention in which three rather than two chain warps are used in a one-shot Axminster construction.
Figure 7:
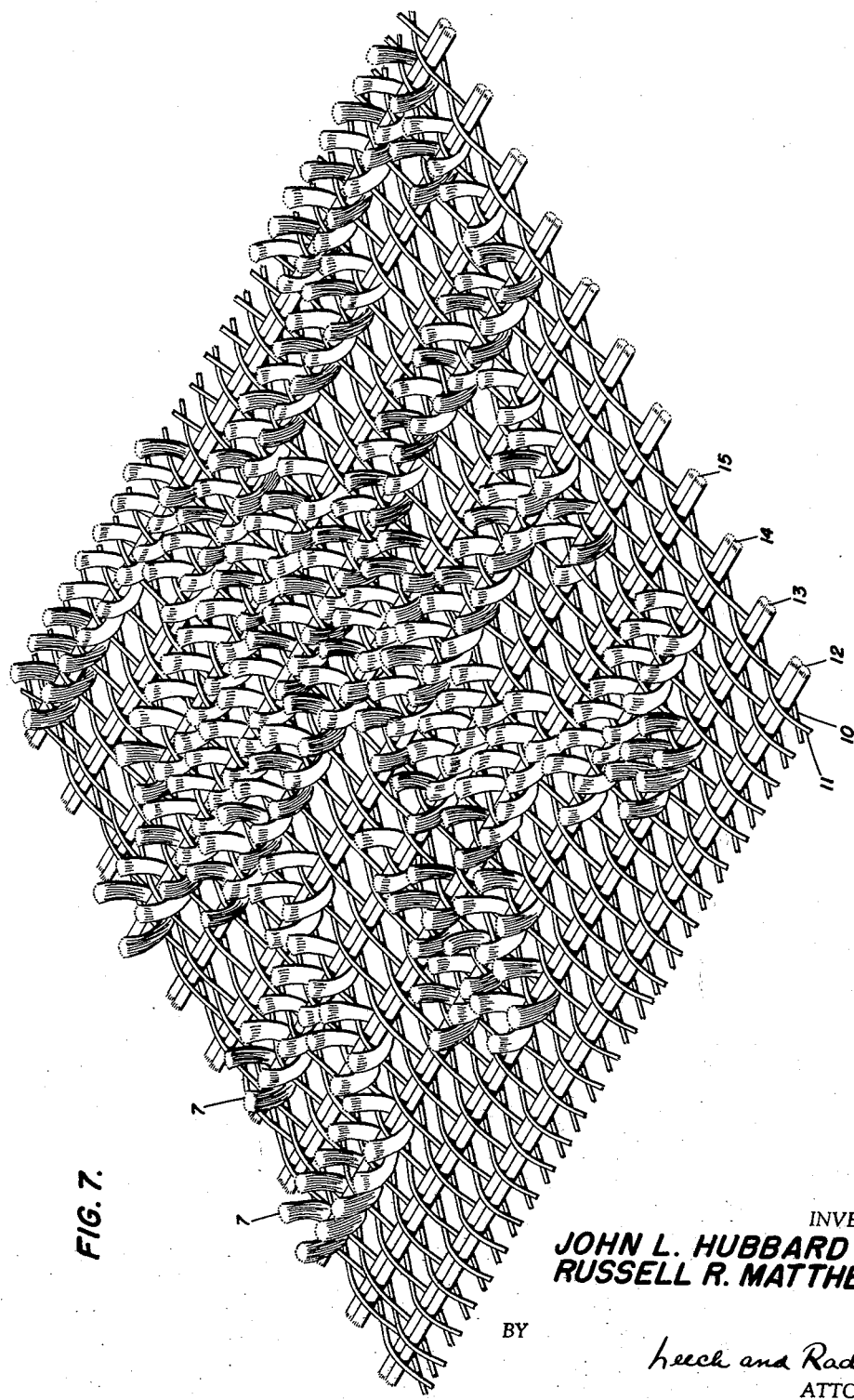
FIGURE 7 is a view similar to the one shown in FIGURE 4 and showing more clearly the interlacing of chain warps with the double weft shots and the U-tufts which go around said double weft shots in certain selected areas.

FIGURE 6 presents a different embodiment of one-shot Axminster weave construction coming within the principles of this invention. While in this construction there is still a saving of a considerable amount of binder material and at least a two-thirds saving of weft material, there has been provided a twill weave with a warp 18 going under double weft shots 12 and 13, and then going over double weft shot 14. In other words, this warp goes under two double weft shots and goes over one double weft shot. A chain warp 19 goes over double weft shots 12 and 13 and under a double weft shot 14, and a binder warp 20 goes over double weft shot 12 and under double weft shots 13 and 14. The progression is over one and under two. Therefore, the warps work as follows:

| Warps | 1st shot | 2nd shot | 3rd shot |
| --- | --- | --- | --- |
| 18 | Down | Down | Up. |
| 19 | Up | Up | Down. |
| 20 | Up | Down | Down. |

This particular embodiment of the invention eliminates the necessity of rethreading a loom that is generally set up for production of the regular Axminster weave shown in FIGURE 2. Warp 18 of FIGURE 6 is actually the same as warp 5 in FIGURE 2. Warp 19 in FIGURE 6 is actually the same as warp 6 in FIGURE 2, and warp 20 of FIGURE 6 corresponds to the stuffer 4 of FIGURE 2. Bearing this in mind, there remains the question how one can insert the face yarn around each double weft shot as is done in practicing this invention, while in a regular Axminster as shown in FIGURE 2, it takes a cycle of three to bring down the face yarn 7 into the fabric and to release the same and cut it off.

Figure 8:
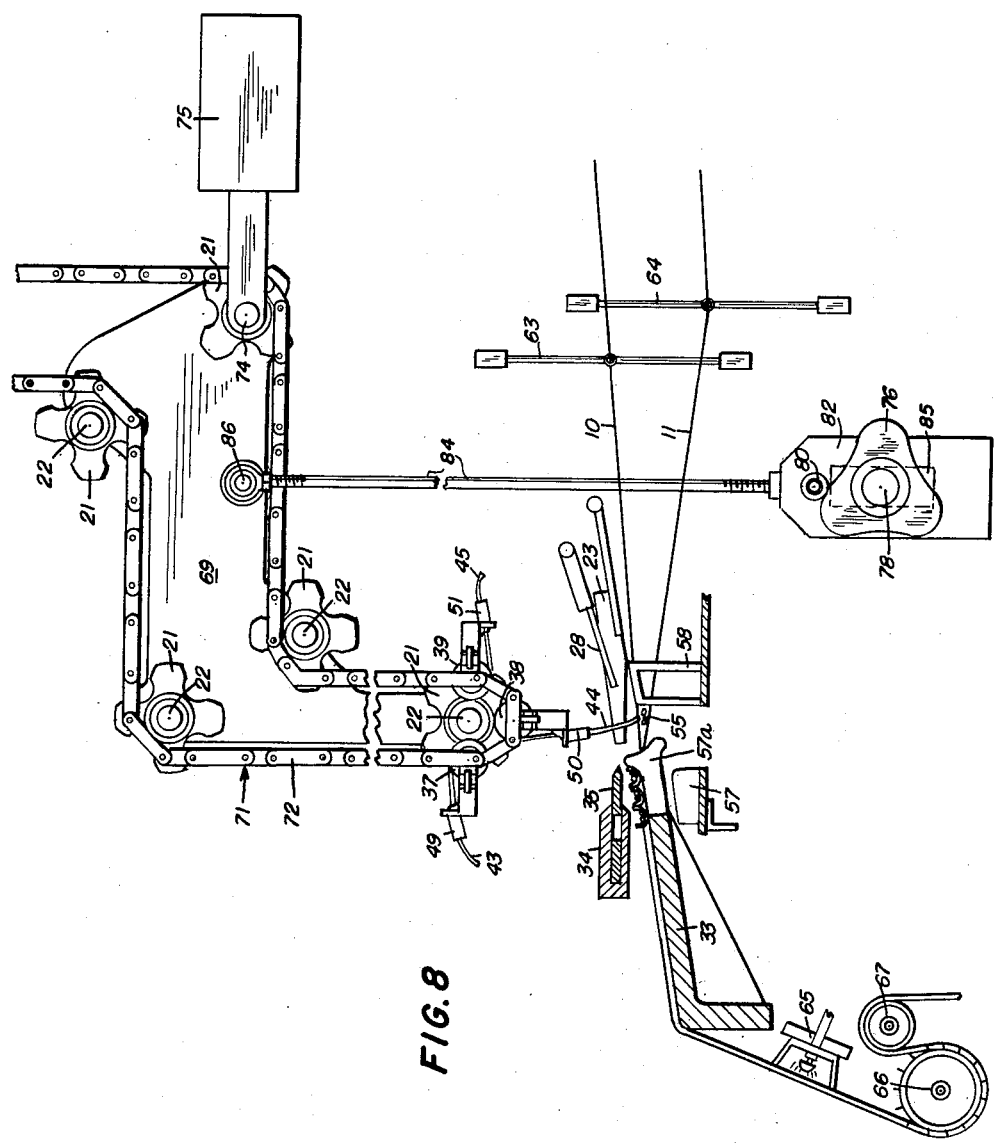
FIGURE 8 is a side elevational view of the apparatus of this invention, particularly showing the means for dipping the entire chain spool frame carrier assembly.

To make this concept more clearly understandable, a full explanation will be made of the preferred form of the present method of making one-shot Axminster weaves. This will be done by referring to the apparatus illustrated in FIGURES 8 to 12. As shown in FIGURE 8 the apparatus includes a breast beam 33 over which the woven fabric passes. A knife blade holder 34 is mounted for horizontal reciprocation above the breast beam 33 and carries a removable knife blade 35. A noseboard cleaner assembly 57 is positioned directly beneath the noseboard 57a.

The chain spool frame carrier assembly 71 comprises a pair of spaced parallel flanges 69, one at each end of the loom, and a plurality of shafts 22 carried between these flanges. Chain sprockets 21 are mounted on these shafts 22 and act to support moving chain 72 on which are carried spool frames 37, 38 and 39. In actual practice a large number of spool frames are used, however, only three are illustrated for sake of simplicity. These spool frames mount yarn tubes 49, 50 and 51 through which face yarns 43, 44 and 45 pass. Shaft 74 pivotally mounted on the loom frame (not shown) carries the chain spool frame carrier assembly 71. This shaft 74 is secured to the flanges 69 by suitable means and also carries a freely rotating chain sprocket 21. In addition a counter-balance 75 is fixedly secured to the shaft 74 to counter-balance the preponderance of weight on one side of the chain spool frame carrier assembly.

In order to pivot the chain spool frame carrier assembly 71 about shaft 74 there is provided a cam 76 mounted on shaft 78 which derives its power from the loom's main power supply. Cam follower 80 is carried on slide 82 from which extends rod 84 pivotally connected to flange 69 by pin 86. The slide 82 has a slot 85 through which the shaft 78 extends so that as cam 76 rotates and engages cam follower 80 to raise and lower the slide, said slide will be held in proper alignment.

Figure 11:
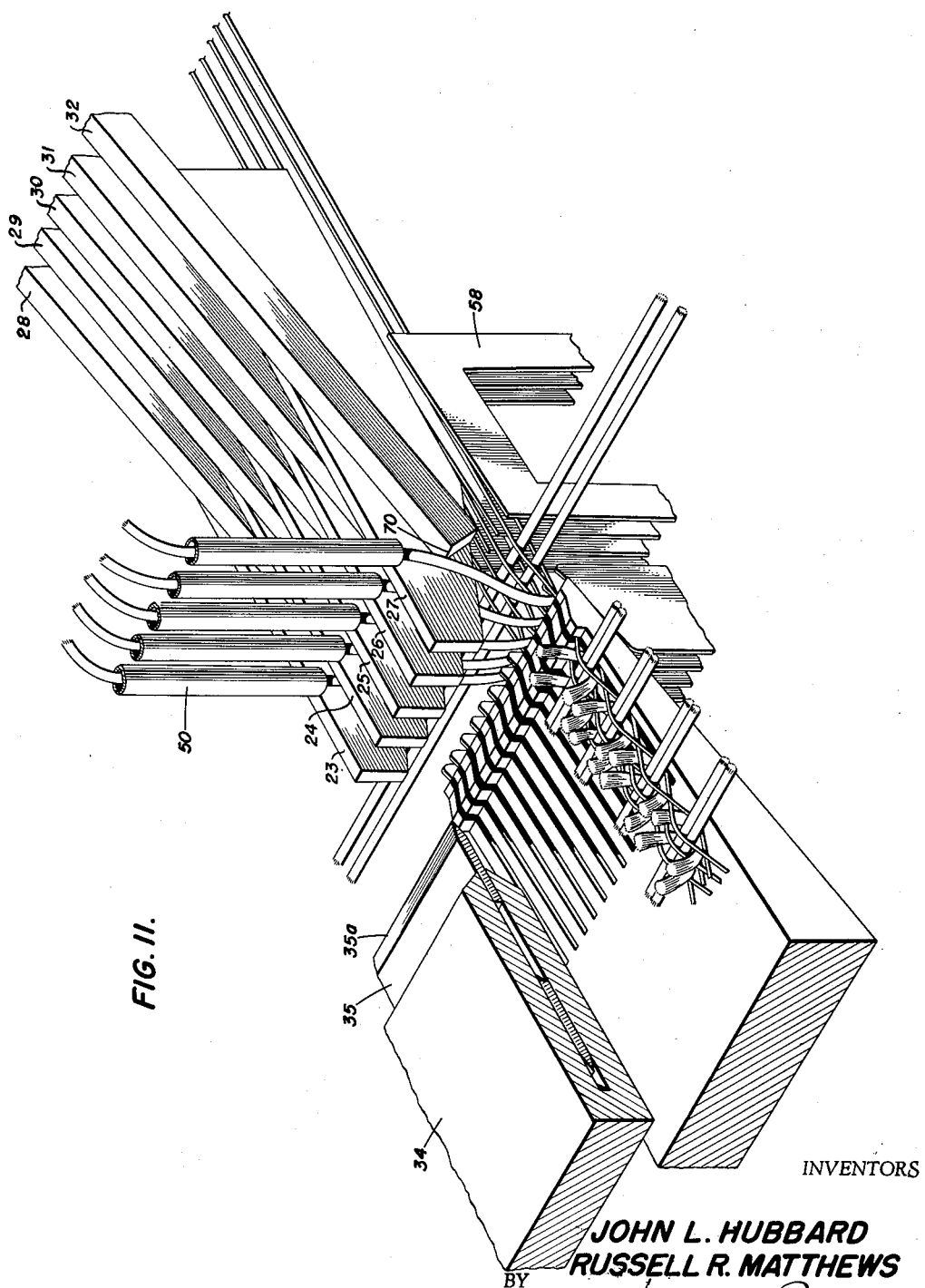
FIGURE 11 shows a plurality of the face yarns in readiness for a cutting operation.
Figure 12:
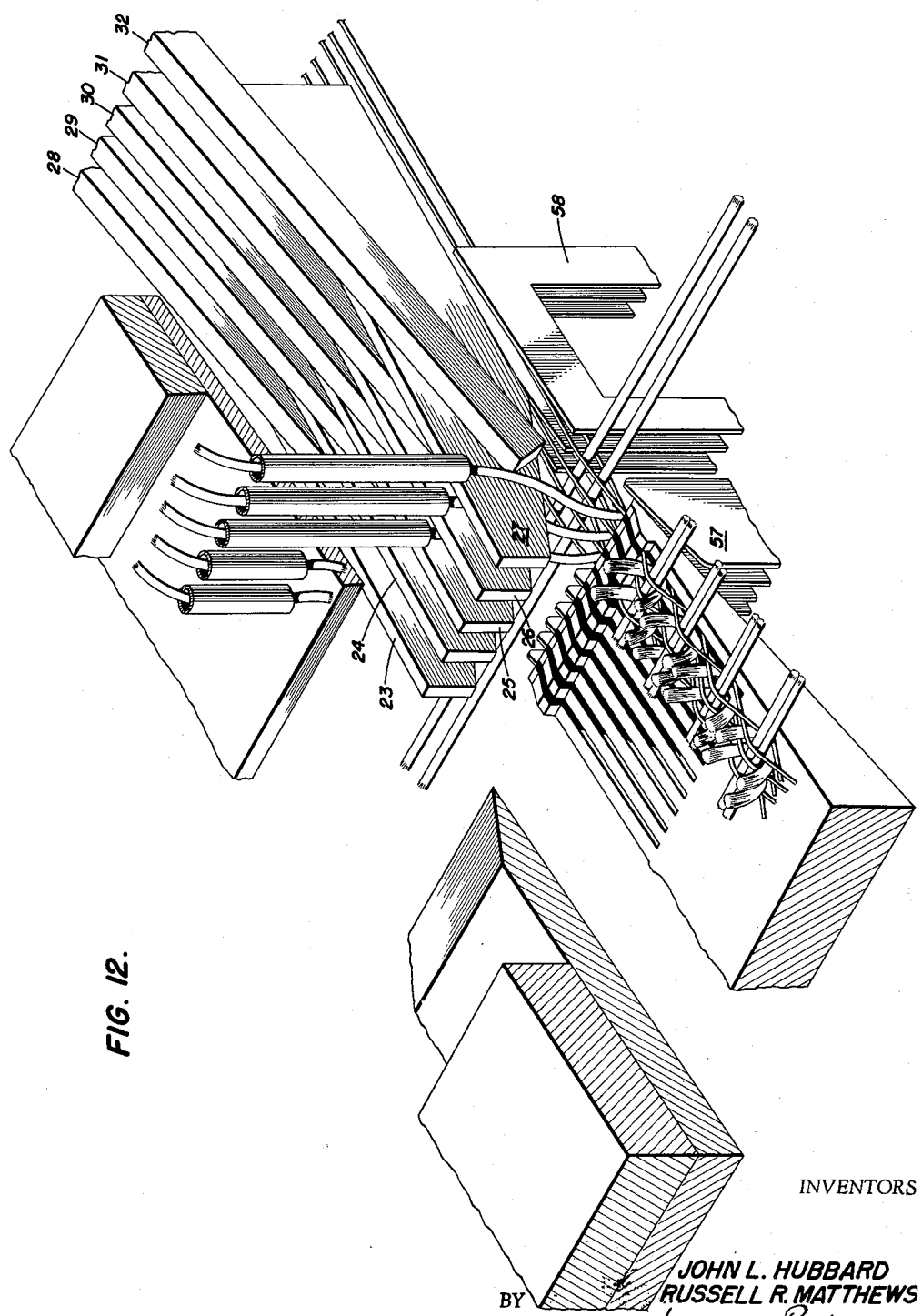
FIGURE 12 is a view similar to FIGURE 11 and showing a different type of cutting blade which is interchangeable.

In order to make certain that the face yarn from the spool enters into the proper place between pairs of chain warps a plurality of vertical dividers 23–27 are provided rearwardly and spaced from the breast beam 33. In between and slightly to the rear are positioned a plurality of separating fingers 28–32 as best illustrated in FIGURES 11 and 12. The loom is also equipped with reed 58 positioned somewhat below the dividers and separating fingers.

Figure 9:
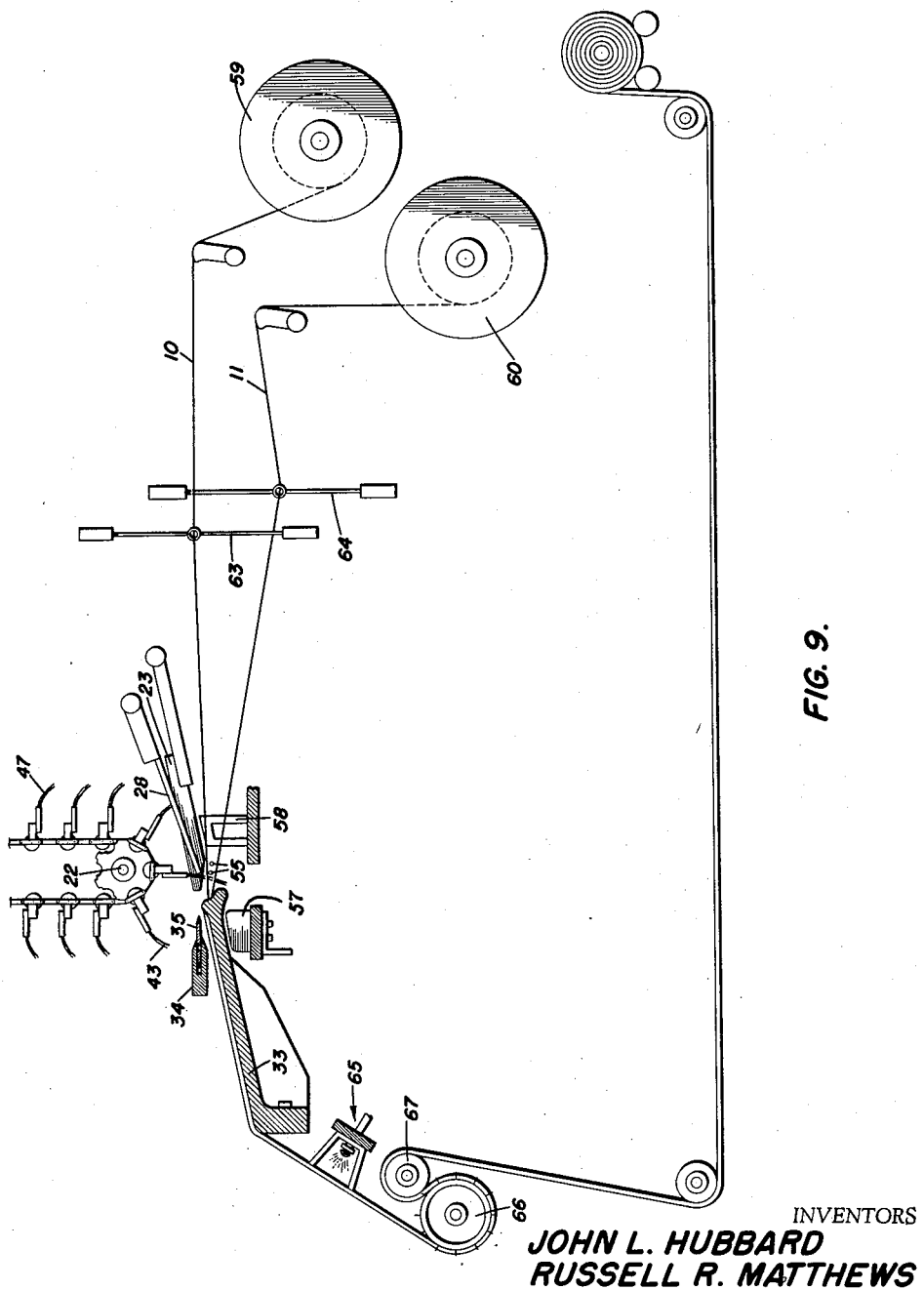
FIGURE 9 shows the method advances to the point where the yarn is being inserted into the back of the carpet being woven.
Figure 10:
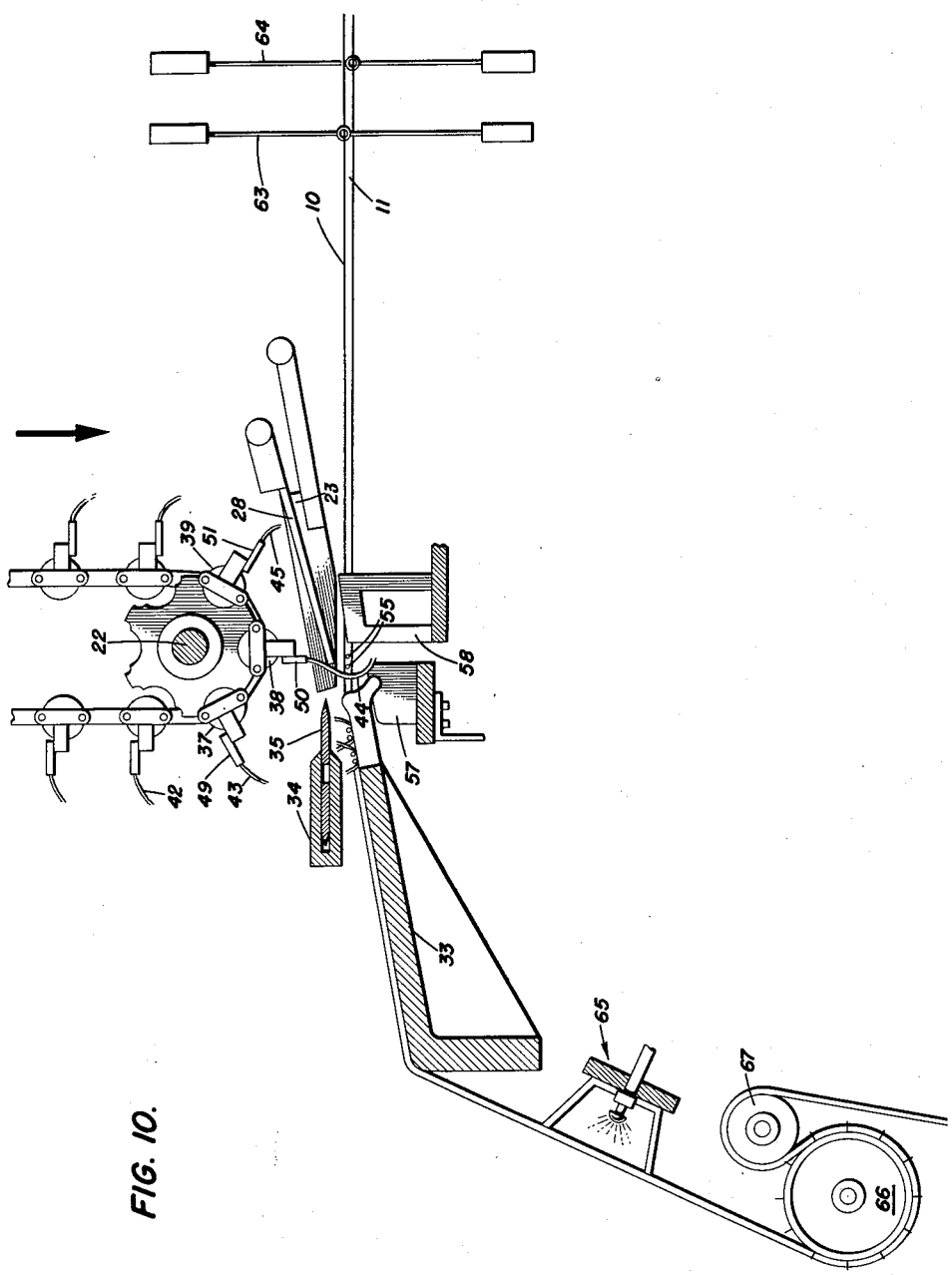
FIGURE 10 is another side view wherein it is shown the step of forming the U-tuft during weaving.

In producing the one-shot Axminster weave of this invention the procedure is as follows: The moving chain 72 powered by any suitable linkage from the main power positions spool frame 38 in place just rearward and above the noseboard as shown in FIGURE 8. Whereupon the chain spool frame carrier assembly 71 dips downwardly so that the face yarn 44 is passed downwardly between adjacent chain warps. It should be noted that the spool frames do not leave the chain spool frame carrier as in the conventional Axminster loom. The separating finger 28 proceeds forward toward the breast beam 33 to engage the face yarn 44 in the lowered position as shown in FIGURE 9 and push it toward the breast beam 33 in order to prevent the face yarn from interfering with the insertion of the double weft shot 55. As the separating finger clears the way, the double weft shot 55 is inserted between warp threads 10 and 11. After this the cleaners 57 of the noseboard 57a come up as shown in FIGURE 10 in order to hold the previously finished threads in line. Upon this being accomplished the reed 58 comes forward to push the weft shot 55 towards the face yarn 44 so as to move it in place. At this point the shed of the warp threads 10 and 11 closes. The warp threads 10 and 11 are fed from warp beams 59 and 60, and heddle frames 63 and 64 respectively. These warp ends are given separate tensions and for that reason it is preferable to have two separate beams so that different tensions may be applied selectively to the respective warp threads. In this manner it is possible to control the evenness of the back of the finished carpet, and the stretch allowed later on during the finishing process.

With the apparatus in the position described thus far, the face yarn 44 will be securely held in position whereupon the chain spool frame carrier assembly 71 rises under the action of cam 76 thereby causing the face yarn to be unreeled. After this the knife blade holder 34 moves to the rear so that the blade 35 may cut the face yarn 44.

The above described procedure is repeated for each weft row to produce the one-shot Axminster weave of this invention.

As mentioned previously, a one-shot Axminster weave may tend to lose the U-tufts before the finishing process due to the lack of the extra two double weft shots that have been eliminated. A number of decades ago such a fabric would have been unmarketable, but today there are various sizing materials which do not need any heating process, such as is necessary for starch and the like. Therefore, it is preferred to use a quick sizing trough 65, by means of which the back of the now woven one-shot Axminster is sized with a material which will dry within seconds, such for instance, as a light application of a commercially available rug seal as made by the United States Rubber Company. This seal will hold the U-tufts 7 in place while the fabric next goes over a spike roller 66, a tension roller 67, and over various other rollers as may be necessary prior to final take up.

After the one-shot Axminster weave is so finished the carpet is inspected for missing tufts and then is treated with any type back sizing that may be advantageous. It has been found, for instance, that a rubber size of high viscosity is more advantageous than one of very thin viscosity because the latter tends to work up through to the carpet face. Also it was found that application on the back of the fabric of a thin layer of foam or sponge rubber, respectively, will be of great advantage because it will give a very smooth and skid-proof back, and at the same time supply a padding for the carpet. Due to the saving of material in the weft and warp and due to the labor saving in having a one-shot instead of three-shot Axminster, it is possible to manufacture a one-shot Axminster carpet with a foam or sponge rubber back at the same cost as an Imperial type three-shot Axminster with a conventional sizing of starch or latex.

In FIGURES 11 and 12 there are shown two different types of knives. In FIGURE 11 there is shown a knife holder 34 with a knife blade 35 as previously explained. The advantages of this type of cutter are that the blade 35 is interchangeable and that the knife holder 34 itself does not have to be removed when the blade becomes dull. The knife blade 35 has a tapered edge 35a which tends to work towards a counteracting scissor edge such as is generally used in a standard Axminster loom. As edge 70 and edge 35a meet, thread 44 now gets cut just after the chain spool 38 goes upward under the action of cam 76 which raises the chain spool carrier assembly 71.

It is not necessary to explain the advantages of the noseboard which are known to those acquainted with this art. It also cannot be overemphasized that continued use and acceptance of the Axminster type fabric necessarily depends on the increased speed of the Axminster loom production coupled with the greater pattern variation provided by this invention.

It will be understood by those skilled in the art to which this invention pertains that various changes and modifications can be made in the preferred embodiment of Axminster weave (that has been illustrated and described) without departing from the principles of the invention and the scope of the appended claims.

This application is a continuation-in-part of United States application, Serial No. 620,549, now abandoned, filed November 5, 1956.

We claim:
1. A method of weaving a one-shot Axminster pile fabric consisting of advancing stepwise a chain spool frame carrier on which are mounted tube frames through which pile yarn is threaded, forming a shed of warp ends, inserting a double weft shot in said shed, forming U-tufts of pile yarn around each double weft shot without removing the tube frames from the carrier, and cutting the thus formed U-tufts from the tube frames.

2. A method of weaving a one-shot Axminster pile fabric which comprises the steps of advancing a chain spool frame carrier on which tube frames are mounted in timed relation with that of the weaving, feeding pile yarn ends through said tube frames, forming a shed of warp ends, inserting a double weft shot in the shed, inserting the pile yarn ends down forward the double weft shot, pushing the double weft shot against the loosely projecting pile yarn ends and moving them into place, to form U-tufts around said weft shot and closing the shed of the warp ends.

3. The method of claim 2 in which each formed tuft is cut from its spool frame tube by a loom operated knife.

4. Apparatus for weaving a one-shot Axminster pile fabric comprising a pivotally mounted chain spool frame carrier assembly, said chain spool frame carrier assembly including a moving chain, a plurality of spool frames mounted therein, a tube frame extending from each spool frame, the spool frames being adapted to carry pile yarn which is fed through the respective tube frames, a noseboard positioned beneath the chain spool frame carrier assembly, means for carrying warp yarns positioned rearwardly of the noseboard, means for maintaining pile yarn ends in separated and spaced relation mounted rearwardly and spaced from the noseboard, and means for pivoting the chain spool frame carrier assembly in timed sequence with the weaving operation so that the pile yarn ends fed from the tube frames will be introduced down between adjacent warp yarns without the tube frames being removed from the chain spool frame carrier assembly.

5. Apparatus for weaving a one-shot Axminster pile fabric comprising a pivotally mounted chain spool frame carrier assembly, said chain spool frame carrier assembly including a moving chain, a plurality of spool frames mounted thereon, a tube frame extending from each spool frame, the spool frame being adapted to carry pile yarn which is fed through the respective tube frames, a noseboard positioned beneath the chain spool frame carrier assembly, at least two beams adapted to carry warp yarn mounted rearwardly of the noseboard, a plurality of dividers spaced rearwardly from the noseboard, a separating finger positioned between each adjacent pair of dividers and means for pivoting the chain spool frame assembly in timed sequence with the weaving operation so that the pile yarn ends fed from the tube frames will be introduced down between adjacent warp yarns without the tube frames being removed from the chain spool frame carrier assembly.

6. The apparatus as described in claim 5 and including a knife member for cutting the pile yarn after it is fed from the tube frames.

References Cited in the file of this patent

UNITED STATES PATENTS

| 2,021,431 | Robertson | Nov. 19, 1935 |
| 2,523,061 | Robb | Sept. 19, 1950 |

FOREIGN PATENTS

| 703,075 | Great Britain | Jan. 27, 1954 |
| 751,969 | Great Britain | July 4, 1956 |